United States Patent
Kalinli

(10) Patent No.: US 8,493,390 B2
(45) Date of Patent: Jul. 23, 2013

(54) ADAPTIVE DISPLAYS USING GAZE TRACKING

(75) Inventor: Ozlem Kalinli, Burlingame, CA (US)

(73) Assignee: Sony Computer Entertainment America, Inc., Foster City, CA (US)

(*) Notice: Subject to any disclaimer, the term of this patent is extended or adjusted under 35 U.S.C. 154(b) by 238 days.

(21) Appl. No.: 12/963,100

(22) Filed: Dec. 8, 2010

(65) Prior Publication Data

US 2012/0146891 A1 Jun. 14, 2012

(51) Int. Cl.
*G06T 17/00* (2006.01)

(52) U.S. Cl.
USPC .......................................... 345/428

(58) Field of Classification Search
None
See application file for complete search history.

(56) References Cited

U.S. PATENT DOCUMENTS

| | | | |
|---|---|---|---|
| 6,182,114 B1 | 1/2001 | Yap et al. | |
| 7,068,813 B2 * | 6/2006 | Lin | 382/103 |
| 7,872,635 B2 * | 1/2011 | Mitchell | 345/158 |
| 2003/0067476 A1 * | 4/2003 | Miller et al. | 345/598 |
| 2004/0103111 A1 * | 5/2004 | Miller et al. | 707/102 |
| 2004/0227699 A1 | 11/2004 | Mitchell | |
| 2006/0187305 A1 * | 8/2006 | Trivedi et al. | 348/169 |

OTHER PUBLICATIONS http://www.engadget.com/2011/03/01/tobii-and-lenovo-show-off-prototype-eye-controlled-laptop-we-go/#disqus_thread, "Tobii and Lenovo show off prototype eye-controlled laptop, we go eyes-on" by Chris Ziegler posted on Mar. 1, 2011, 5 pages.
International Search Report and Written Opinion for International Application No. PCT/US2011/40574, mailed Sep. 28, 2011, 11 pages.

* cited by examiner

*Primary Examiner* — Hau Nguyen
*Assistant Examiner* — Ryan M Gray
(74) *Attorney, Agent, or Firm* — Blakely, Sokoloff, Taylor & Zafman LLP

(57) ABSTRACT

Methods and systems for adapting a display screen output based on a display user's attention. Gaze direction tracking is employed to determine a sub-region of a display screen area to which a user is attending. Display of the attended sub-region is modified relative to the remainder of the display screen, for example, by changing the quantity of data representing an object displayed within the attended sub-region relative to an object displayed in an unattended sub-region of the display screen.

22 Claims, 9 Drawing Sheets

ADAPTIVE DISPLAYS USING GAZE TRACKING

FIELD

The present invention relates to use of gaze tracking for outputting information on a display screen of a computing platform in an adaptive way.

DESCRIPTION OF THE RELATED ART

With recent technological advancement in display screens, such as LCD screens, OLED screens, and the like, the variety of computing platforms employing display screens as well as the functionality demanded of platform continues to increase. For example, limited screen area and battery life typical of handheld form factors has tended to keep spatial resolution of the display screen relatively low so that the usefulness of the handheld device is often limited by the inability of the display screen to present a sufficient field of view (FOV) to reveal the most pertinent data (e.g., a sub-region of a frame of image data, a sub-region of a GUI, etc.) to an end user without continual active user intervention (e.g., screen taps, swipes, etc.). For another exemplary platform, large display screens typical of home televisions are designed for much longer viewing distances than those of a personal computer or handheld device. As such, it is often necessary to present graphical data objects on the home television with a distinct interface, such as a "10-foot interface," requiring a user to learn to navigate multiple interfaces between devices of differing form factor.

Additionally, certain computing platforms offer applications which display video (i.e., a stream of image data frames) collected by a video image sensor integrated with computer rendered graphical objects. For example, the Sony Playstation® EyePet™ gaming application renders a graphical image of a virtual pet along with video of the application user and user environment (e.g., living room) that is collected by a video image sensor coupled to the computing platform. The user can then view themselves on the display interacting with their virtual pet. With the high definition display resolutions typical for such gaming applications (e.g., 1080p), significant bandwidth is required to transmit the video data from the video image sensor to the computing platform. This bandwidth limitation either reduces the quality of the video data presented on the display, reduces processor cycles available for rendering graphics, or significantly increases the manufacturing cost of the video image sensor/interface between the sensor and computing platform. Video transmission bandwidth becomes all the more problematic for both wireless intranet transmission modes and internet transmission modes.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

Figure 1:
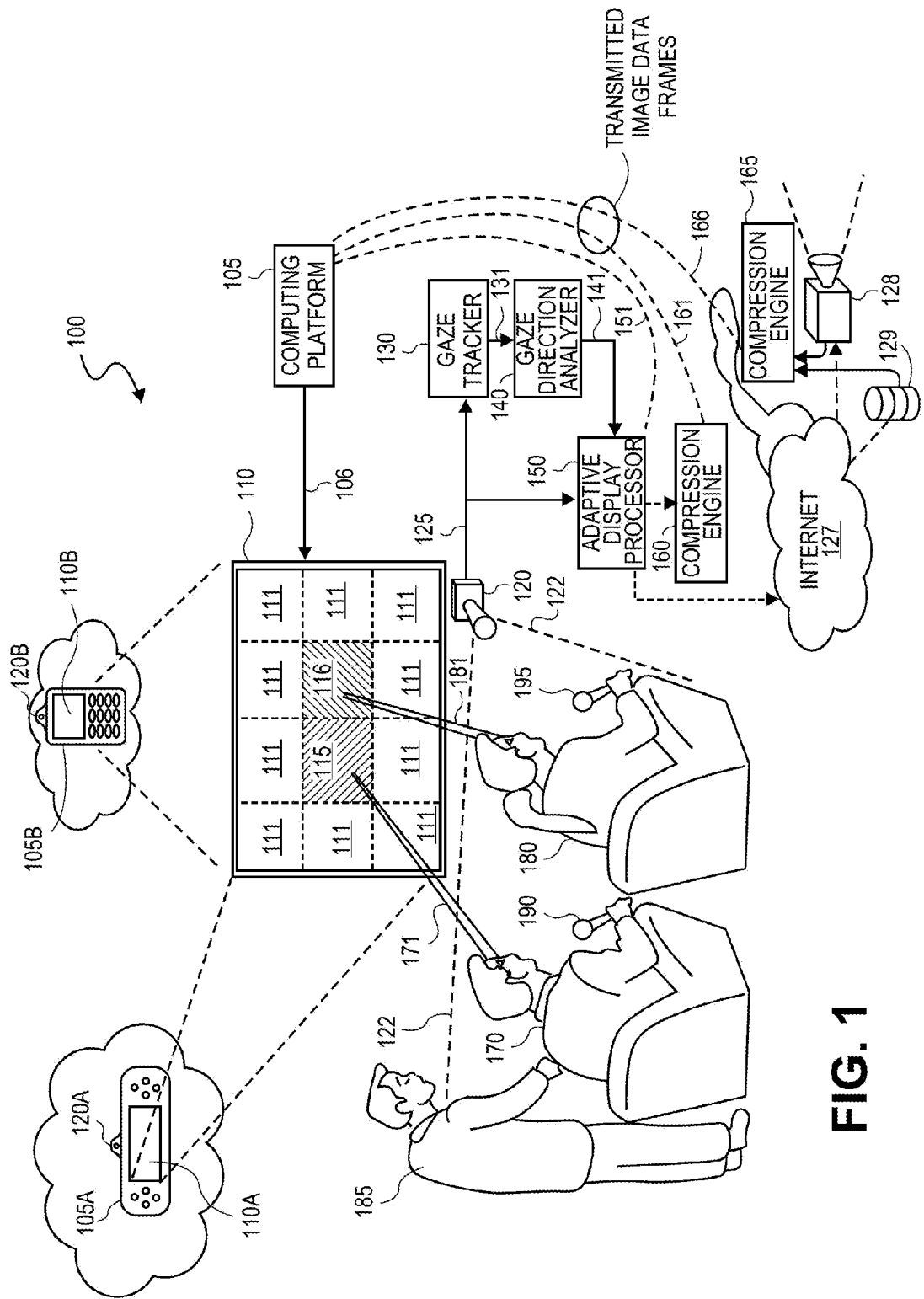
FIG. 1 illustrates a schematic diagram of an exemplary adaptive display system, in accordance with an embodiment.

For clarity of illustration, elements illustrated in the figures have not necessarily been drawn to scale. Further, where considered appropriate, reference numerals have been repeated among the figures to indicate corresponding or analogous elements.

DETAILED DESCRIPTION

Described herein are methods and systems for adapting a display screen output based on a display user's attention. Embodiments employ gaze tracking to determine sub-regions of a display screen area which are at a user's focus of attention and adaptively determine the quantities of data provided for attended and unattended sub-regions of the display screen by processing these two groups separately to improve functionality of the application/platform and/or to reduce the bandwidth required to transmit or process collected frames of image data.

While numerous specific details are set forth in order to provide a thorough understanding of embodiments of the invention, it will be understood by those skilled in the art that other embodiments may be practiced without these specific details. In other instances, well-known methods, procedures, components and circuits have not been described in detail so as not to obscure the present invention. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

FIG. 1 illustrates an exemplary adaptive display system 100 including a computing platform 105 coupled to a display screen 110. The computing platform 105 includes a central processor which is at least responsible for generating output 106 for the display screen 110 and may further perform one or more of gaze tracking, display sub-region determination, and video decoding/frame assembly operations described herein. The computing platform 105 may be specially constructed for the required purposes, or may comprise a general purpose computer selectively activated or reconfigured by a computer program stored in the computer. In one embodiment, computing platform 105 is a game console (e.g., a Sony Playstation®) with a display screen 110 being any conventional display (e.g. LCD, OLED, CRT, etc). In another embodiment, the computing platform 105 is a handheld game device 105A (e.g., Sony Playstation Portable (PSP®) with an embedded display screen 110A (e.g. LCD, OLED). In an alternative embodiment, the computing platform 105 is a handheld telecommunications device 105B (e.g., Sony Ericsson mobile phone) with an embedded display screen 110B (e.g. LCD, OLED).

Figure 2A:
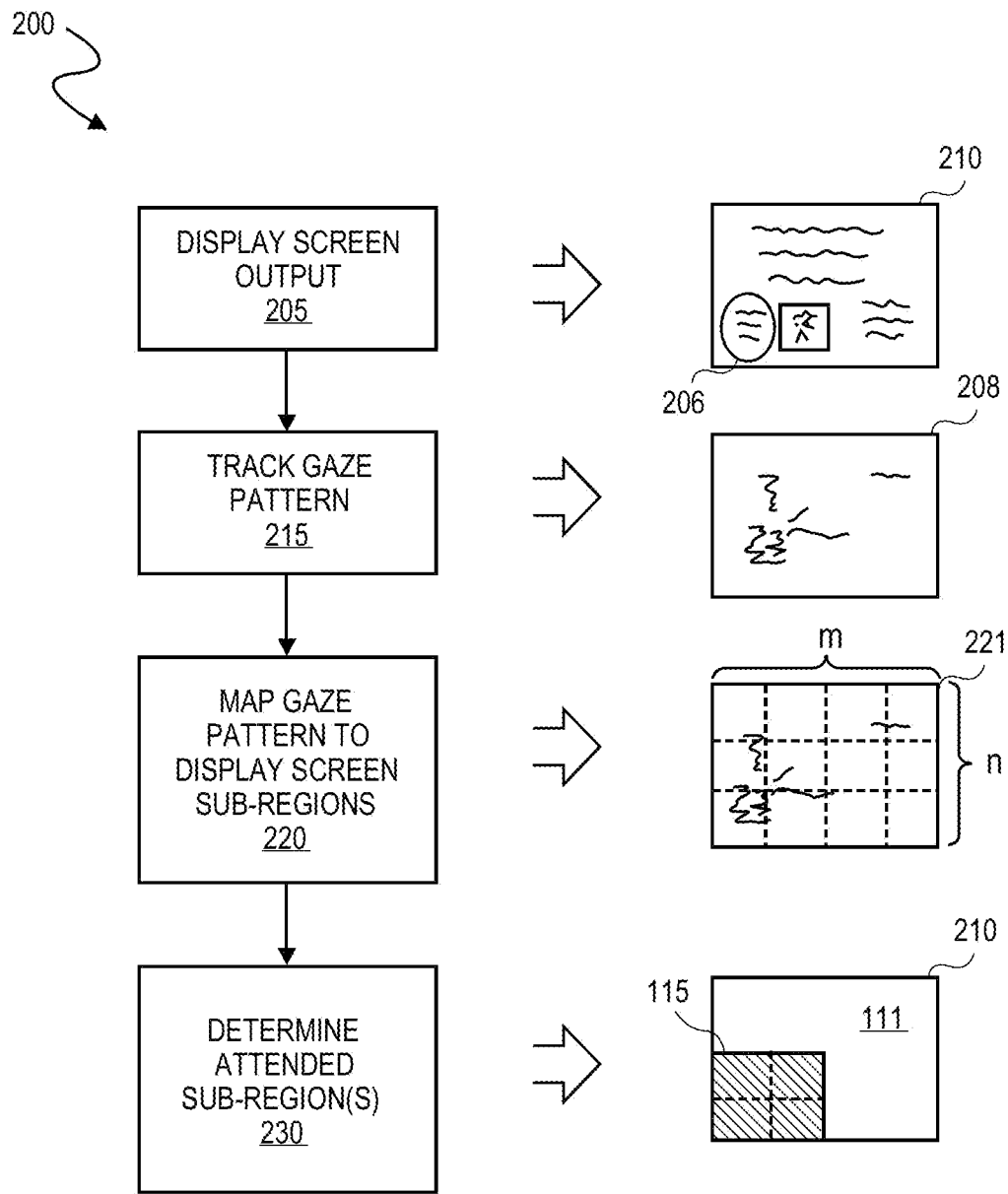
FIG. 2A is a flow diagram of an exemplary grid-based method of determining an attended sub-region of a displayed image data frame, in accordance with an embodiment.
Figure 2B:
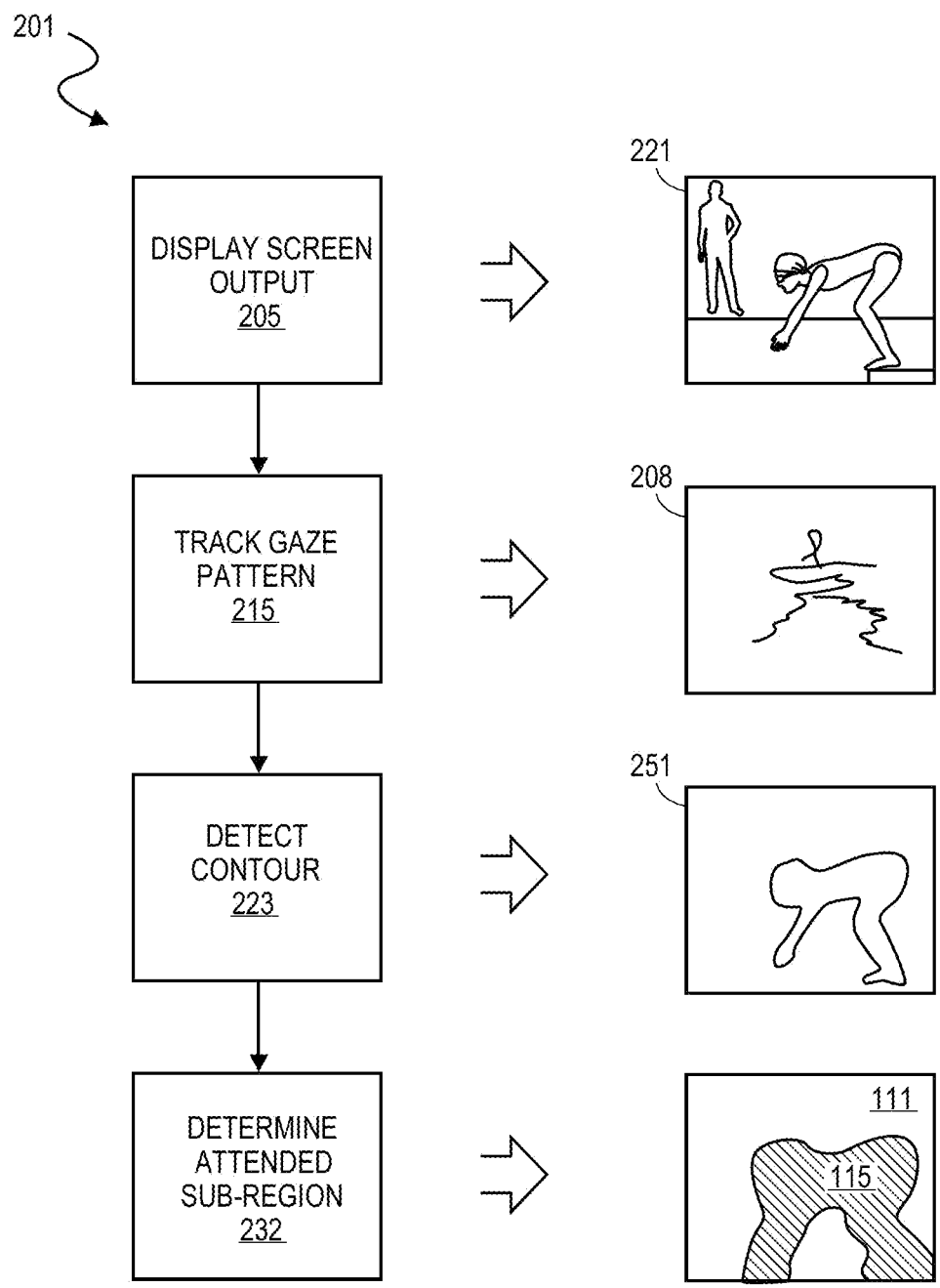
FIG. 2B is a flow diagram of an exemplary contour-based method of determining an attended sub-region of a displayed image data frame, in accordance with an embodiment.

FIGS. 2A and 2B illustrate two exemplary methods for determining attended sub-regions of a frame of information presented in a display screen. The methods may be applied to either rendered graphical objects (e.g., CGI) or to streamed multimedia (e.g., video).

FIG. 2A is a flow diagram illustrating an embodiment of a grid-based method 200 for determining an attended sub-region of an image data frame which may be performed by the adaptive display system 100. At operation 205, one or more objects are output to the display screen 110 (FIG. 1). For example, an object 206 in the display area 210 is further illustrated in FIG. 2A. Object 206 may be a rendered object, for example a gaming avatar, a web page block which has a positional relationship to a frame of the display area 210 known by the rendering engine. For example, where object 206 is a thumbnail image on a web page, the thumbnail image object will have a known position within the display area 210. Alternatively, object 206 may be a portion of a video frame presented within the display area 210, in which case a logical association between the object 206 and other content within the display area 210 may not be predetermined by the computing platform 205.

At operation 215, a gaze pattern of a user viewing the display screen 110 is tracked. FIG. 2A further depicts an exemplary gaze pattern 208 determined for the content in display area 210 by a gaze tracker 130 coupled to the computing platform 105 (illustrated in FIG. 1). Generally, the gaze tracker 130 includes any hardware and/or software modules known in the art operable to track eye position and/or eye movement of a platform user 170 viewing the display screen 110. In the exemplary embodiment, the gaze tracker 130 is a video-based system which focuses on one or both eyes of the platform user 170 and records eye movement as the platform user 170 views the display screen 110. The gaze tracker 130 may be either head mounted, or a remote system relying on a video image sensor positioned at least an arm's length from the platform user 170. In the exemplary embodiment depicted in FIG. 1, the gaze tracker 130 outputs an eye gaze direction pattern 131 to a gaze direction analyzer 140. In other embodiments, the gaze tracker 130 is head mounted and outputs an eye rotation pattern. In other embodiments, the user can wear electrodes placed on the skin around the eyes to measure Electrooculogram (EOG) signal for eye movement tracking. The EOG signal would be especially useful for measuring saccadic eye movement due to gaze shifts and detecting blinks; hence good for determining gaze shifts and blinks The EOG is also robust to different lighting conditions, and can be implemented as wearable system.

In an exemplary embodiment, the video image sensor employed by the gaze tracker 130 is a special-use camera (e.g., IR sensitive) integrated into the gaze tracker 130. Alternatively, the gaze tracker 130 may be coupled to a general purpose digital video image sensor 120, such as a Sony Playstation® Eye, which is also coupled to the computing platform 105. In an embodiment, the digital video image sensor 120 collects image data frames at high definition (HD) resolution of at least 1,920×1,080 pixels with a field of view (FOV) 122 sufficient to capture at least the platform user 170 and the user's immediate environment (e.g., living room furnishings, floor, room walls, etc.) and may further capture at least one other platform user 180, as well as a bystander 185.

Because far-field gaze tracking is more technically challenging than near-field gaze tracking, the gaze tracking implementation may depend on the format of the computing platform 105. For example, in the game console format, the gaze tracker 130 preferably utilizes a special-use camera which is optimized for the purpose of eye/gaze tracking and distinct from the video image sensor 120. Optionally user/s can be registered by taking a headshot of the user/s to improve gaze tracking performance.

For the handheld game device 105A, however, an embedded video image sensor 120A may be operable to output to the gaze tracker 130 collected image data frames 125 including the eye(s) or face of the platform user 170. For such an embodiment, image data collected by the embedded video image sensor 120A may be used for both gaze tracking purposes and general for display on the display screen 110A. Similarly, for the handheld telecommunications device 105B, embedded video image sensor 120B is operable to output to the gaze tracker 130 collected image data frames 125 focusing on the eye(s) or face of the platform user 170. In still other embodiments, the general purpose digital video image sensor 120 may be absent with only a special use camera integrated into the gaze tracker 130.

Returning to FIG. 2A, at operation 220, a gaze pattern (e.g., the gaze pattern 208) is mapped by a gaze direction analyzer to sub-regions of a display screen. For example, the gaze pattern 208 is mapped to an m-by-n grid of sub-regions. Generally, the numbers m and n defined for a display screen may vary considerably as dependent on physical size and resolution of a particular display screen and is to be optimized, for example to provide the most satisfactory user experience. The optimization of grid size parameters can be done offline by investigating a relation between the device size and the grid size parameters. Then, the grid size parameters can be automatically set/loaded based on the display's features which can be obtained either registering display to the system (i.e. the user can enter the dimensions of the physical device or select one of the pre-defined options), or automatically detecting the display type using the computing platform i.e. whether it's a PSP or a Sony Ericson phone or a Sony LCD TV.

At operation 230, the gaze direction analyzer determines one or more of the sub-regions 221 to be of greater interest to a user based on the gaze pattern 208. For example, a gaze pattern metric may be assigned to the sub-regions 221 and the metric then thresholded or compared between the sub-regions to determine the attended sub-region(s). For example, in the display area 210 in FIG. 2A, 115 and 111 are attended and unattended sub-regions, respectively. While any conventional gaze pattern metric may be employed at operation 230, in exemplary embodiments, a number of eye fixations or a gaze pattern scan length within each sub-region is determined.

FIG. 2B is a flow diagram of an embodiment of a contour-based method 201 of determining an attended sub-region of an image data frame which may be performed by the adaptive display system 100. Where image data frames received from the video image sensor 120 may not have any logical block hierarchy as may a rendered GUI, a contour algorithm may be utilized to identify objects which are the subject of a platform user's attention. In particular embodiments, a new contour detection process is triggered periodically or by an event, for example when a user blinks or gaze shifts.

The method 201 begins at operation 205, with one or more objects output to the display screen 210 (e.g., frames of image data collected by a video image sensor). The gaze pattern is tracked as previously described at operation 215, to generate the gaze pattern 208 represented in FIG. 2B. At operation 223 a contour detection algorithm is executed (for example by the gaze direction analyzer 140) to detect contours within the image data frame 221. The contour detection algorithm may be initiated at a particular location of the frame based on the gaze pattern or a contour detection algorithm may be applied to the entire frame. In the first case, a contour which encompasses a threshold amount of the gaze pattern is generated, and in the second case, one or more contours are selected from a plurality of contours based on a level of overlap between the gaze pattern and a particular contour/s. As an example, the contour 251 is generated based on the frame 221 and gaze pattern 208. At operation 232, an attended sub-region is then determined. This determination may entail a selection of the contour 251 or further execution of an upsizing algorithm to include pixels of the frame 221 proximate to the contour 251 within the first portion of the frame corresponding to the attended sub-region 115. The remainder of the frame is then designated as a second portion of the frame corresponding to the unattended sub-region 111.

Use of the contour-based method 201 to correlate portions of an image data frame with an attended sub-region of a display may improve realism relative to a direct mapping of m-by-n grids between a display and a frame of image data. The contour-based method 201 may also reduce transmission bandwidth below what is possible with a direct mapping of m-by-n grids between a display and a frame of image data, for example where the grid size is not optimally matched to the size of objects in the image data.

Figure 3A:
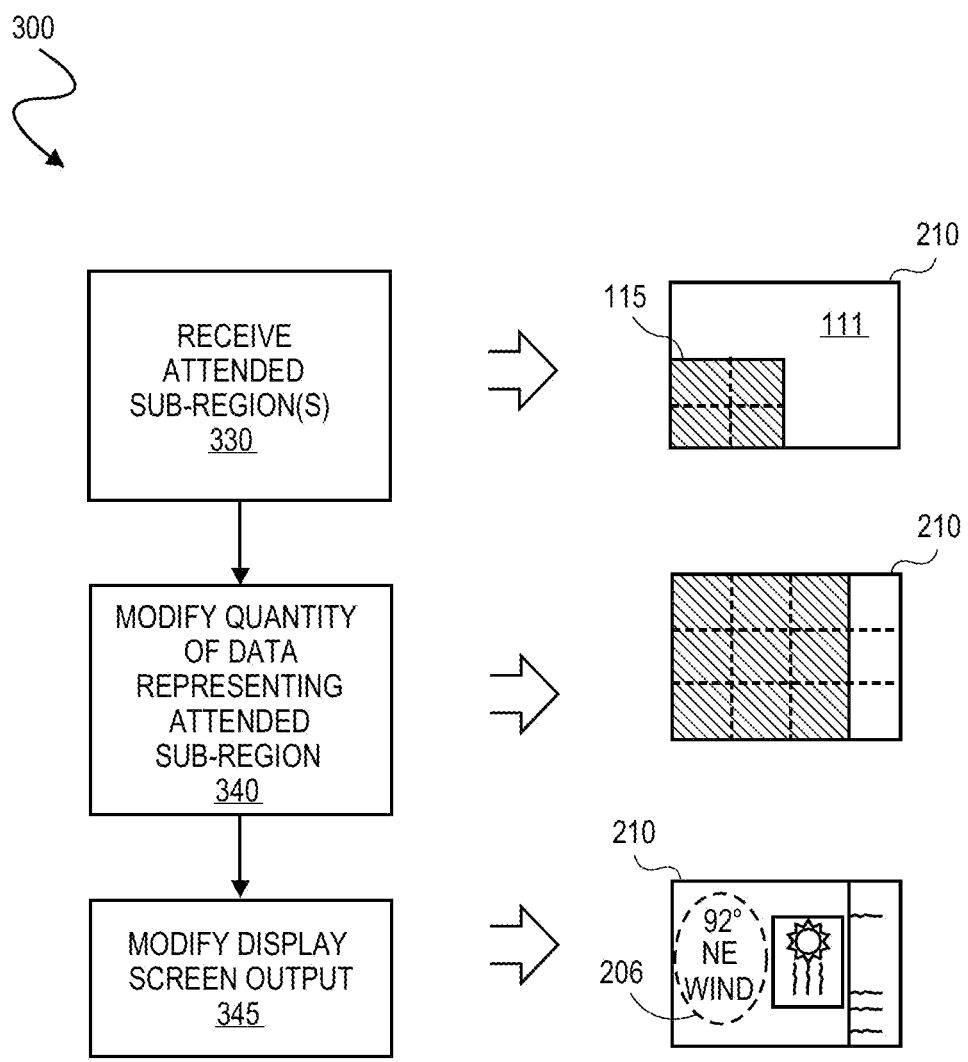
FIG. 3A is a flow diagram of an exemplary method of adapting an amount of data to be displayed based on a display user's attention, in accordance with an embodiment.

FIG. 3A illustrates a method 300 for adapting a display in which the quantity of data employed to represent one or more objects in an attended sub-region is modified relative to objects in an unattended sub-region by displaying portions of data frames at a variable resolution dependent on the user's focus of attention. At operation 330, at least one attended sub-region is received from method 200 or 201, for example the attended sub-region 115 in FIG. 2A or FIG. 2B. At operation 340, the quantity of data representing an object displayed within the attended sub-region is modified to change the amount of data pertaining to the objects within the attended region relative to the amount of data provided by the display screen prior to the sub-region determination. In a content zoom embodiment, a percentage of the display screen resolution dedicated to the attended sub-region may be increased with the percentage of the display screen resolution pertaining to unattended sub-regions reduced so the resolution of the attended sub-region is higher than the unattended sub-region resolution. For example, the attended sub-region 115 received at operation 330 being 25% of the display area 210 is increased to about 67% of the display area 210 at operation 340. At operation 345, the modified output is displayed with a zoomed-in object 206. As such, object 206 may be rendered at a higher resolution, or expanded (e.g., where object 206 is a thumbnail image).

As further depicted in FIG. 1, the adaptive display system 100 includes an adaptive display processor 150 coupled to the gaze direction analyzer 140. In the exemplary embodiment, the adaptive display processor 150 is a signal processor implemented in either hardware, software, or a combination of both. For the adaptive display method 300, a processor of the computing platform 105 receives the output 151 from the adaptive display processor 150 for modification of the displayed data.

Figure 3B:
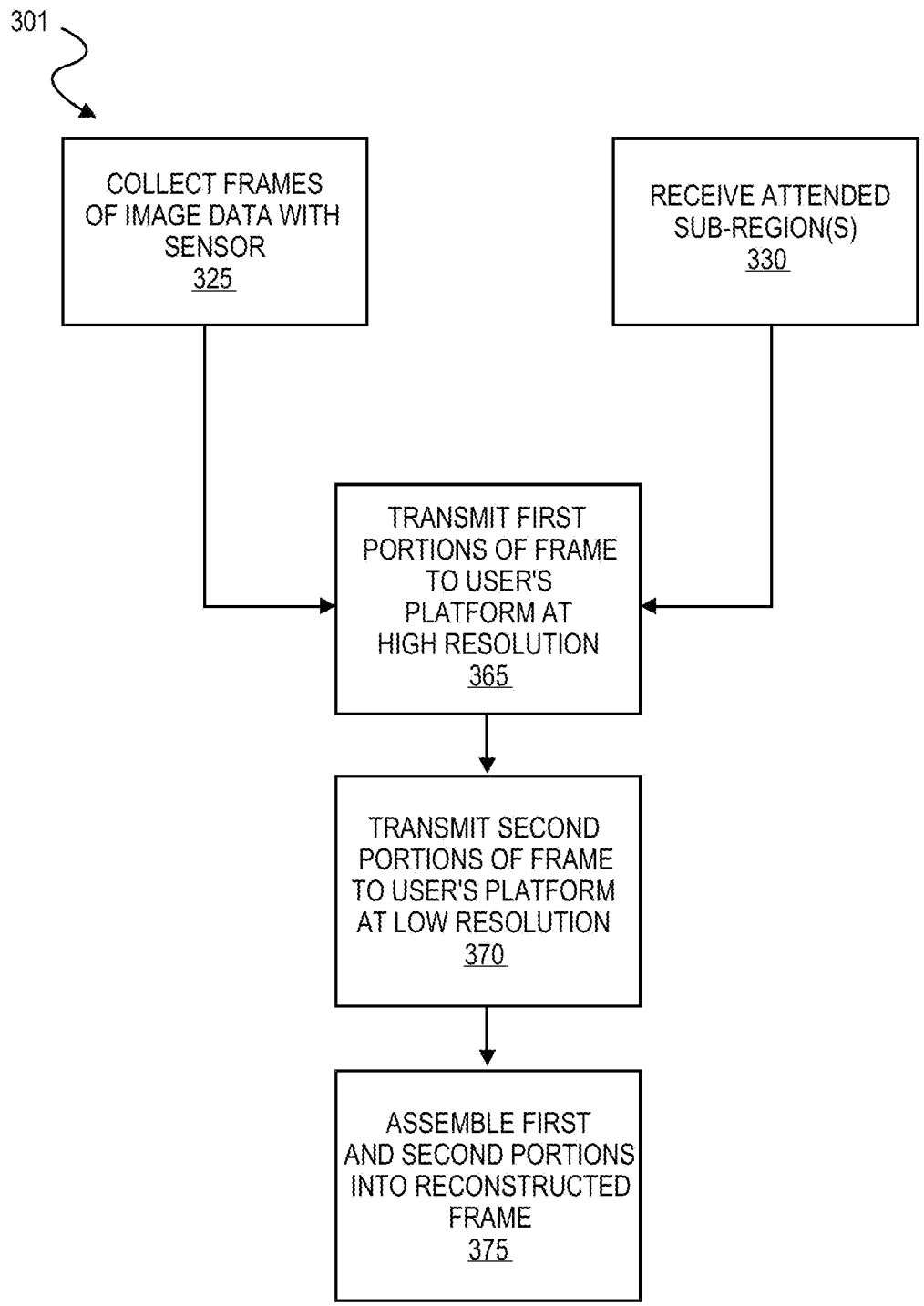
FIG. 3B is a flow diagram of an exemplary method of adapting an amount of data to be transmitted based on a display user's attention, in accordance with an embodiment.

FIG. 3B is a flow diagram of an exemplary method 301 for adapting a display in which the quantity of data representing objects in an attended sub-region is modified relative to objects in an unattended sub-region by transmitting portions of image data frames (e.g., collected by a video image sensor, such as video image sensor 120) to the computing platform 105 at a variable resolution dependent on the user's focus of attention. In an embodiment, attended sub-regions are transmitted at higher resolution whereas the unattended sub-regions are transmitted at lower resolution. As image data frames will be transmitted at a high rate, the method 301 may be executed periodically a frequency below the frame rate with an attended sub-region, once determined, applied to multiple frames. The method 301 may be triggered based on an event, such as, but not limited to, a predetermined number of frames, a distance metric to determine if eye gaze is deviated from the selected (i.e. attended) sub-region, or an indication the user blinked, which is a possible sign of expected eye gaze shift.

Beginning at operation 325, the video image sensor 120 collects frames of image data. For the embodiment depicted in FIG. 1, the video image sensor 120 has a FOV 122 which encompasses the platform user 170, a second platform user 180, and a bystander 185.

At operation 330, attended sub-regions 141 are received from the gaze direction analyzer 140. At operation 365, the attended sub-regions of the display are correlated to portions of the collected frame(s) and a first portion of a collected frame(s) corresponding to an attended sub-region is transmitted to computing platform at a high resolution (e.g., HD resolution of at least 1,920×1,080 pixels of video image sensor 120). At operation 370, a second portion of the collected frame(s) corresponding to an unattended sub-region is transmitted to computing platform at a low resolution, below that of the first portion. For example, where the video image sensor 120 collects at a high resolution, the adaptive display processor 150 down-samples the second portion of the collected frame(s) to reduce the quantity of data representing the second portion using any conventional bit rate shaping technique. As such, the bit rate shaping algorithm is made dependent on a user's attention to the displayed output. In one embodiment, the adaptive display processor 150 reduces the spatial (horizontal and/or vertical) resolution of the second portion relative to the first portion, reducing the transmission bandwidth requirement. As one example where the first portion is transmitted with a resolution corresponding to a sampling of 1,920 samples per scanline, the second portion is downsampled to a sampling of 1,440 or 1,280 samples per scanline. In another embodiment, the adaptive display processor 150 reduces the temporal resolution of the second frame portion relative to the first portion to reduce the transmission bandwidth requirement. For example, frame rate may be reduced within the second portion relative to the first portion. The display screen portions are then transmitted, for example in FIG. 1 via link 161 to a processor of computing platform 105. At operation 375, the computing platform processor assembles the first and second portions into a reconstructed frame, using any conventional technique, for output to the display screen 110.

In some embodiments where image data frames collected by a video image sensor are output to a display screen, the quantity of data representing objects in an attended sub-region is modified relative to those in an unattended sub-region via variable bit rate compression. For such embodiments, a compression engine local to the image sensor is to receive output from the adaptive display processor 150. For example, referring to FIG. 1, the compression engine 160 is hardware or software operable to compress frames of image data 125 received from the video image sensor 120. The compression engine 160 may execute any compression algorithm(s) known in the art, for example execute one or more proprietary or standard-compliant codecs (e.g., MPEG-4) to perform at least one of intraframe (spatial) compression and interframe (motion) compression. In the exemplary embodiment the compression engine 160 is to perform both intraframe and interframe compression of the collected image data frames 125.

Figure 3C:
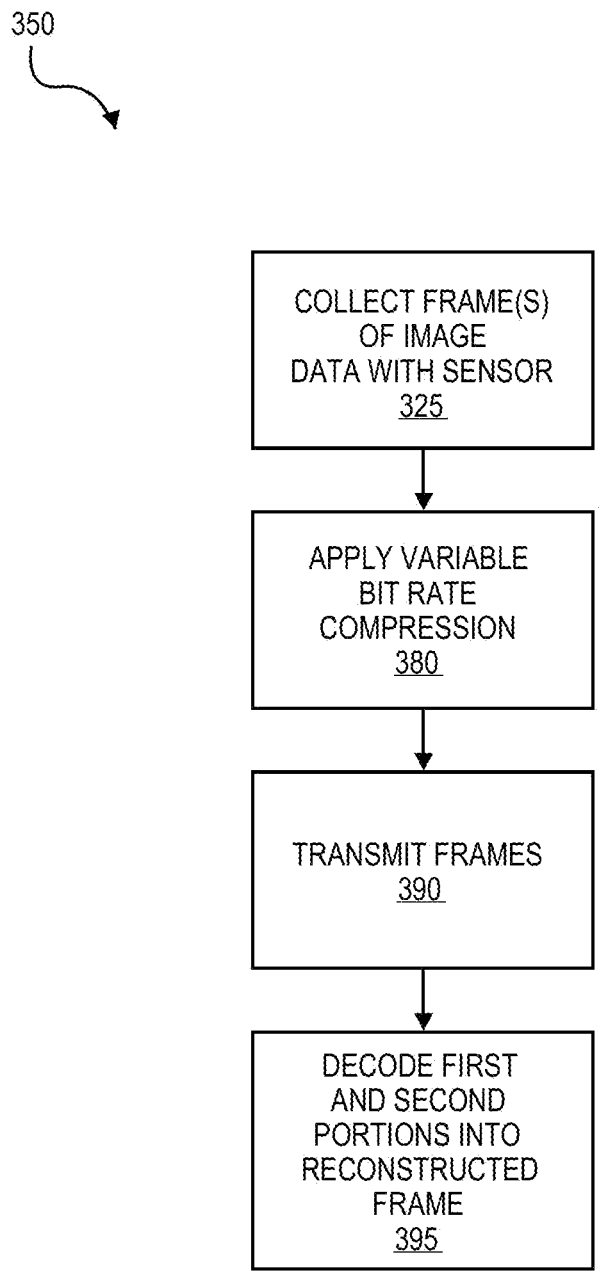
FIG. 3C is a flow diagram of an exemplary method of adapting a data compression rate based on a display user's attention, in accordance with an embodiment.

FIG. 3C is a flow diagram of an exemplary method 350 for adapting a display in which a compression engine applies variable bit rate compression of collected image data frames based on gaze tracking information. Beginning again with operation 325, the video image sensor collects frames of image data. As shown in FIG. 1, the video image sensor 120 has a FOV 122 which encompasses the platform user 170, a second platform user 180, and a bystander 185.

At operation 380, a variable bit rate compression algorithm is applied to the collected image data frames. In one embodiment, a first portion of the collected frames corresponding to an attended sub-region is compressed (spatially and/or temporally) at a high bit rate while a second portion of the collected frames corresponding to an unattended sub-region is compressed (spatially and/or temporally) at a low bit rate (i.e., lower than the first portion).

At operation 390 the compressed frames are transmitted, for example to the computing platform 105. At operation 395, a processor on the computing platform 105 that is coupled with the compression engine 160 then decodes the first and second portions of the frame with the proper decoding algorithm (e.g., as applied to each portion) to assemble the transmitted frame(s) of image data into a reconstructed frame for display on the display screen 110.

Figure 3D:
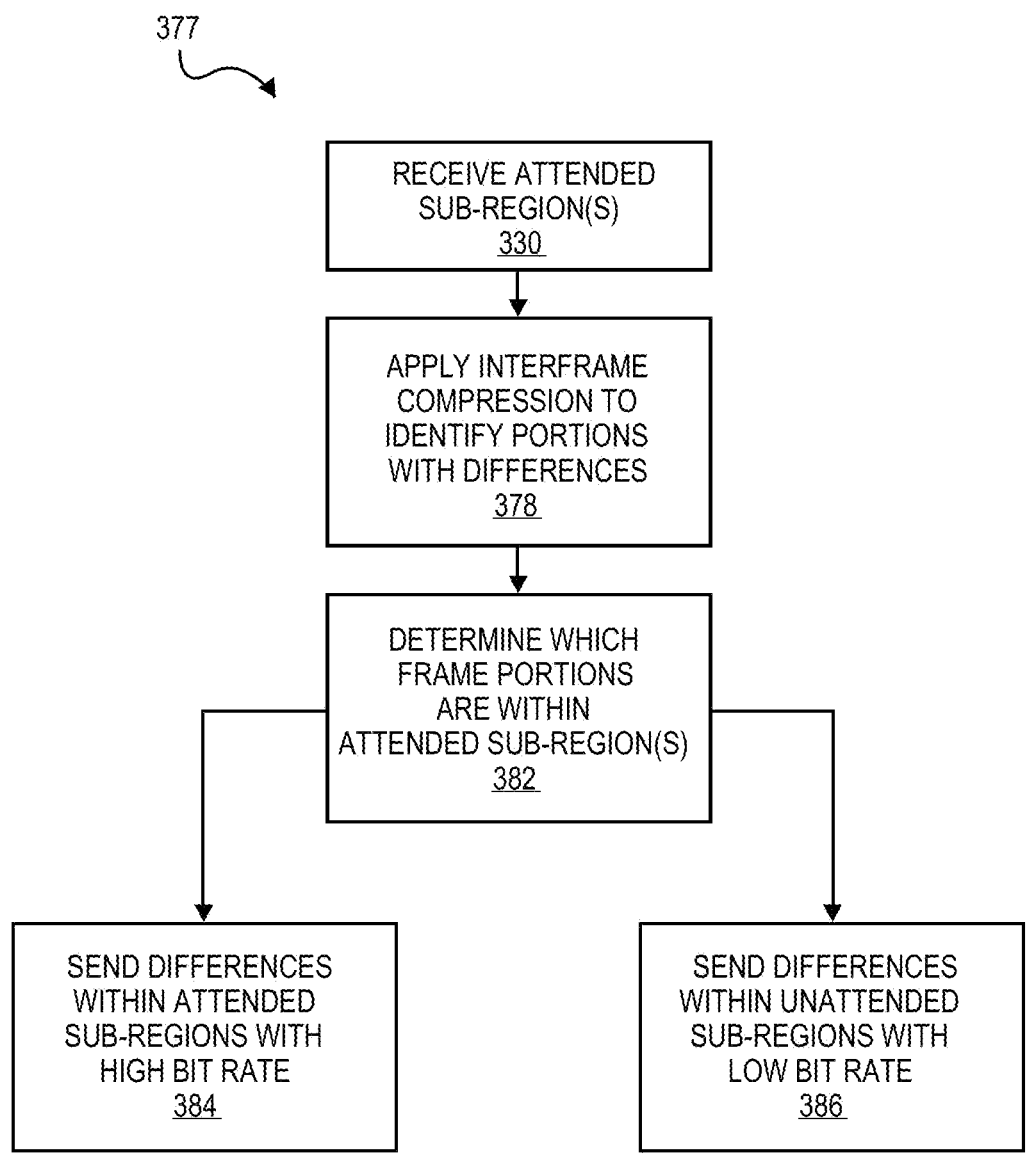
FIG. 3D is a flow diagram of an exemplary method of adapting an interface data compression rate based on a display user's attention, in accordance with an embodiment.

FIG. 3D is a flow diagram further illustrating an exemplary variable bit rate compression method 377 which may be performed at the 380 operation of the method 350 (FIG. 3C). Method 377 begins with receiving an attended sub-region(s) at operation 330. The attended sub-region(s) may be identified/determined substantially as described for the method 200 in FIG. 2A or as described for the method 201 in reference to FIG. 2B. For example, in the case of method 200 in FIG. 2A, the display screen 110 is divided into a grid of m-by-n sub-regions. The numbers m and n may be optimized to maximize a combination of the perceptual quality of the display and transmission bandwidth reduction. The gaze direction analyzer 140 maps the eye gaze direction pattern output 131 from the gaze tracker 130 to the m-by-n sub-regions. A gaze pattern criterion is applied across the sub-regions and the attended sub-region 115 is identified.

Returning to FIG. 3D, at operation 378 the compression engine 160 determines the pixels or image portions that are to be compressed based first on a standard compression algorithm. For example, image portions that are changing between frames are identified with an interframe compression algorithm. At operation 382, the compression engine 160 determines which of those image portions with differences are located within the attended sub-region 115 and, at operation 384, those differences are sent (e.g., to the computing platform 105) at a high bit rate. At operation 386, differences for the unattended sub-regions 111 are sent (e.g., to the computing platform 105) at a low bit rate (e.g., lower than for attended sub-regions). Similarly, the compression engine 160 may execute intraframe compression algorithms in a manner dependent on the sub-regions identified by the gaze direction analyzer 140. For example, the compression engine 160 may apply different thresholds in a spatial redundancy algorithm in a manner which discriminates between the attended sub-region 115 and the unattended sub-region 111. In another embodiment, the variable bit rate compression performed at operation 380 may distinguish I-frame treatment between portions of the collected frame corresponding to the attended and unattended sub-regions of the display. For example, rules preventing I-frames from copying data from other frames may be relaxed for the portions of the frame corresponding to the unattended sub-regions.

In some embodiments the video image sensor 120 having a FOV containing at least the platform user 170 may be employed. However, in other embodiments, as illustrated by frame 221 in FIG. 2B, collected frames do not contain the platform user 170. For such embodiments, the collected image data frames are source by a video image sensor remote from a platform user's location (e.g., in FIG. 1, the remote video image sensor 128 networked to the computing platform 105) or a server of previously collected image data frames (e.g., a video archive site 129 networked via the internet 127). For such embodiments, a remote compression engine 165 may be utilized to implement the gaze-dependent compression algorithms described herein in response to information received from the adaptive display processor 150. It should also be noted that the methods 301, 350 and 377 are similarly applicable to transmissions of image data frames from the video archive site 129 or remote video image sensor 128.

In further embodiments, a gaze pattern is tracked for each of a plurality of users. For example referring back to FIG. 1, a gaze pattern may be tracked for each of the platform user 170 and the platform user 180. A separate determination of sub-regions of the display screen attended to by each of the plurality of users may then be determined (e.g., at operation 215). For example, the direction of the gaze 171 may be tracked and the attended sub-region 115 identified and the direction of the gaze 181 also tracked and the attended sub-region 116 identified. The display screen output is then adapted following the methods described herein to modify the quantity of data within an attended sub-region relative to an unattended sub-region. While these methods can be extended in this manner to multiple users, as the number of users increases, the bandwidth reduction rate may decline. However, this will depend on the nature of the information displayed. For example, in some game applications, users' gazes might overlap considerably because of task-driven attention. For example, in a tennis game, it is highly likely that both users' gazes will be on the tennis ball in the game.

In other multi-user embodiments, for example where game play alternates between the platform user 170 and the platform user 180, gaze tracking and/or gaze direction analysis may be performed only for the user associated with an input device, such as the Sony PlayStation® Move Motion Controller. In the exemplary embodiment depicted FIG. 1, the platform user 170 is associated with the motion controller 190, for example based on the image frames collected by the video image sensor 120, and the gaze pattern tracking is performed for only the platform user 170 while the associated motion controller 190 is in an active game play mode. When game play shifts to the motion controller 195, gaze tracking is then performed only on the platform user 180 who is associated with that controller. Any of the display adaptation methods described herein may then be individualized across a plurality of users.

Figure 4:
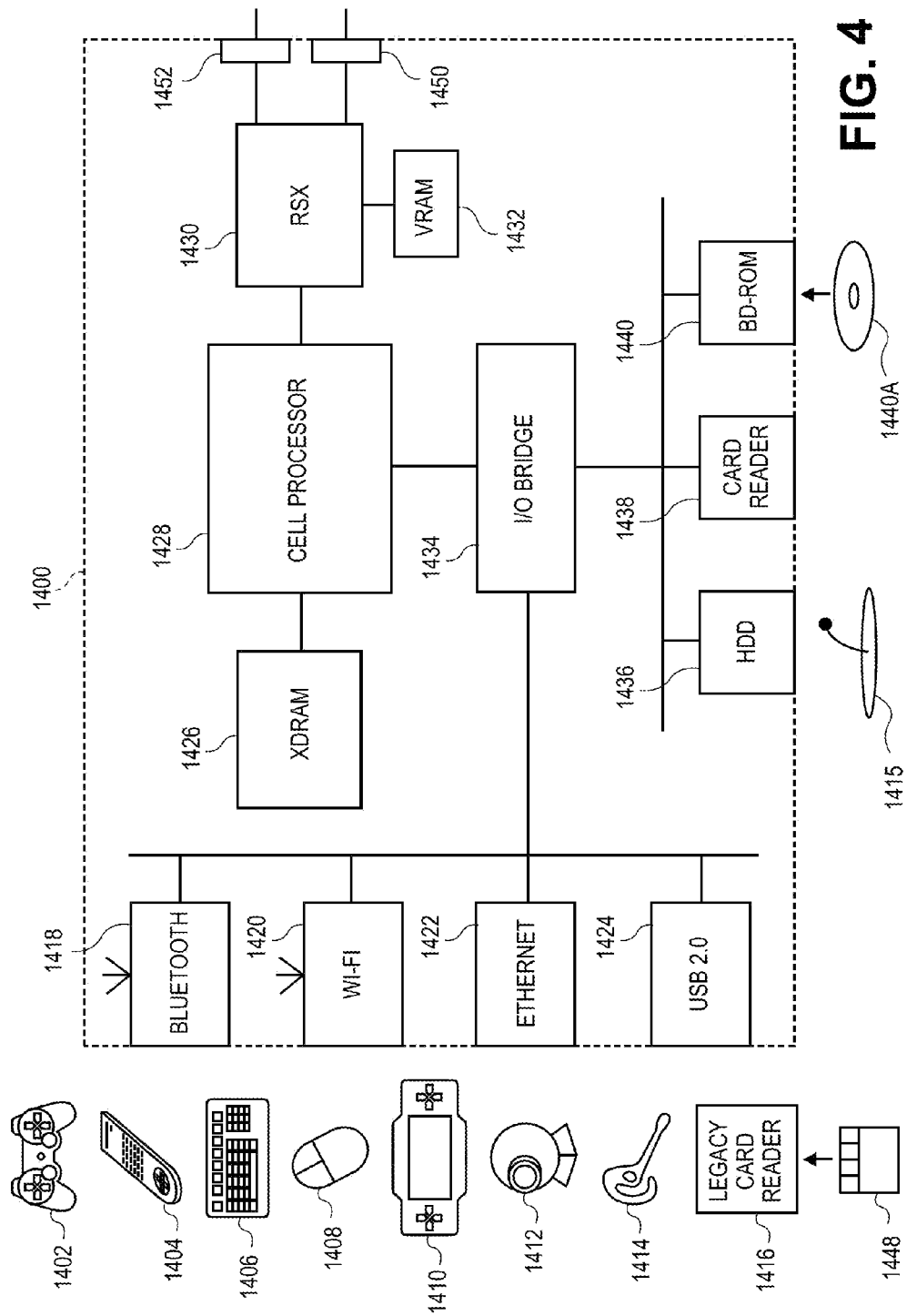
FIG. 4 illustrates hardware and user interfaces that may be used to adapt a display, in accordance with one embodiment of the present invention.

FIG. 4 further illustrates hardware and user interfaces that may be used to adapt a display based on gaze tracking, in accordance with one embodiment of the present invention. FIG. 4 schematically illustrates the overall system architecture of the Sony® Playstation® 3 entertainment device, a console that may be compatible for implementing the adaptive display methods described herein. A platform unit 1400 is provided, with various peripheral devices connectable to the platform unit 1400. The platform unit 1400 comprises: a Cell processor 1428; a Rambus® dynamic random access memory (XDRAM) unit 1426; a Reality Simulator graphics unit 1430 with a dedicated video random access memory (VRAM) unit 1432; and an I/O bridge 1434. The platform unit 1400 also comprises a Blu Ray® Disk BD-ROM® optical disk reader 1440 for reading from a disk 1440A and a removable slot-in hard disk drive (HDD) 1436, accessible through the I/O bridge 1434. Optionally the platform unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controller 1402. For example when a user is playing a game, the I/O bridge 1434 receives data from the game (motion) controller 1402 via a Bluetooth link and directs it to the Cell processor 1428, which updates the current state of the game accordingly.

The wireless, USB and Ethernet ports also provide connectivity for other peripheral devices in addition to game controller 1402, such as: a remote control 1404; a keyboard 1406; a mouse 1408; a portable entertainment device 1410 such as a Sony Playstation® Portable entertainment device; a video image sensor such as an Playstation® Eye video image sensor 1412; a microphone headset 1414; a microphone or microphone array 1415, or the gaze tracker 130. Such peripheral devices may therefore in principle be connected to the platform unit 1400 wirelessly; for example the portable entertainment device 1410 may communicate via a Wi-Fi ad-hoc connection, while the microphone headset 1414 may communicate via a Bluetooth link.

The provision of these interfaces means that the Playstation 3 device is also potentially compatible with other peripheral devices such as digital video recorders (DVRs), set-top boxes, digital video image sensors, portable media players, Voice over IP telephones, mobile telephones, printers and scanners.

The game controller 1402 is operable to communicate wirelessly with the platform unit 1400 via the Bluetooth link, or to be connected to a USB port, thereby also providing power by which to charge the battery of the game controller 1402. Game controller 1402 can also include memory, a processor, a memory card reader, permanent memory such as flash memory, light emitters such as LEDs or infrared lights, microphone and speaker, an acoustic chamber, a digital video image sensor, an internal clock, a recognizable/identifiable shape such as a spherical section facing the game console, and wireless communications using protocols such as Bluetooth®, WiFi™, etc.

Game (motion) controller 1402 is a controller designed to be used with two hands. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

The remote control 1404 is also operable to communicate wirelessly with the platform unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The platform unit 1400 is operable to supply audio and video, either generated or decoded by the Playstation 3 device via the Reality Synthesizer graphics unit 1430, through audio and video connectors to a display and sound output device such as, the display screen 110. The audio connectors 1450 may include conventional analogue and digital outputs while the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

In one embodiment, the video image sensor 1412 comprises a single charge coupled device (CCD), and an LED indicator. The sensor 1412 may further comprise software or hardware-based data compression and encoding apparatus so that compressed video data may be transmitted in an appropriate format such as an intra-image based MPEG (motion picture expert group) standard for decoding by the platform unit 1400. The video image sensor LED indicator is arranged to illuminate in response to appropriate control data from the platform unit 1400, for example to signify adverse lighting conditions. Embodiments of the video image sensor 1412 may variously connect to the platform unit 1400 via an HDMI, USB, Bluetooth or Wi-Fi communication port. Embodiments of the video image sensor may include one or more associated microphones and may also be capable of transmitting audio data. In embodiments of the video image sensor, the CCD may have a resolution suitable for high-definition video capture. In use, images captured by the video image sensor may for example be incorporated within a game or interpreted as game control inputs. In another embodiment the video image sensor is an infrared video image sensor suitable for detecting infrared light.

Figure 5:
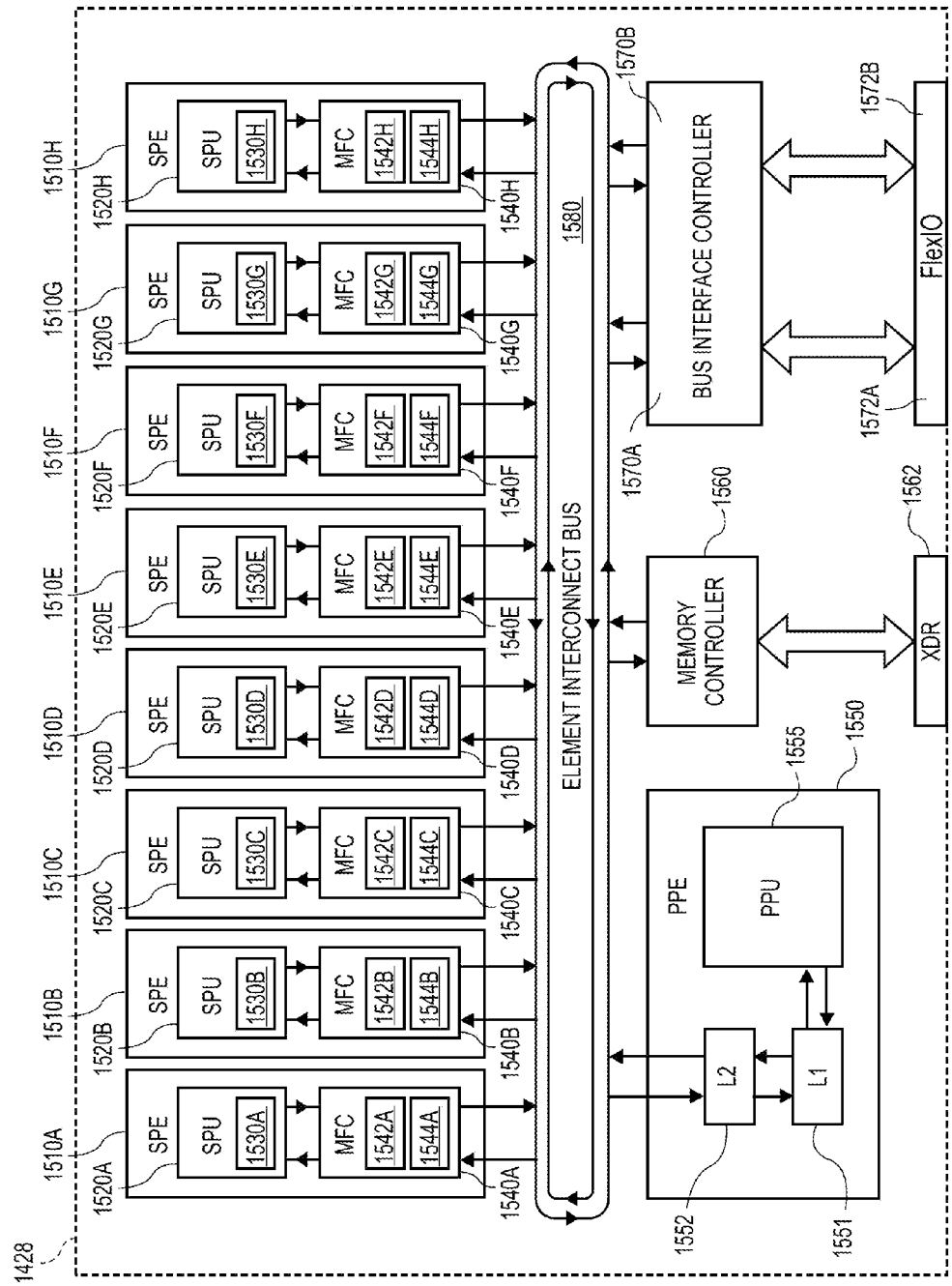
FIG. 5 illustrates additional hardware that may be used to process instructions, in accordance with one embodiment of the present invention.

FIG. 5 illustrates additional hardware that may be used to process instructions, in accordance with one embodiment of the present invention. Cell processor 1428 of FIG. 4, as further illustrated in FIG. 5, has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus (EIB) 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache 1552 and a 32 kB level 1 (L1) cache 1551. The PPE 1550 is capable of eight single position operations per clock cycle, translating to 25.6 GFLOPs at 3.2 GHz. The primary role of the PPE 1550 is to act as a controller for the SPEs 1510A-H, which handle most of the computational workload. In operation the PPE 1550 maintains a job queue, scheduling jobs for the SPEs 1510A-H and monitoring their progress. Consequently each SPEs 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMAC controller 1542A-H to access memory via the EIB 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface controller 1570A, B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1378, developed by Rambus Incorporated. The memory controller interfaces with the Rambus XDRAM 1426 with a theoretical peak bandwidth of 25.6 GB/s.

The dual bus interface controller 1570A, B comprises a Rambus FlexIO® system interface 1572A, B. The interface is organized into 12 channels each being 8 bits wide, with five paths being inbound and seven outbound.

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method of adapting a display, comprising:
   collecting image data at a frame rate with a video image sensor;
   presenting output on a display screen, the output including one or more frames of the image data;
   tracking a gaze pattern of a user viewing the display screen output;
   mapping the gaze pattern to physical locations of the display screen;
   determining, based on the mapping, a sub-region of the display screen being attended to by the user, the determining performed while collecting additional frames of image data with the video sensor, and performed periodically at a frequency below the frame rate, or in response to an indication the user blinked, or a gaze shift is above a threshold;

transmitting the additional frames of the image data to the computing platform with a greater bit rate for a first portion of each additional frame of the image data corresponding to the attended sub-region than for a second portion of each additional frame of the image data corresponding to the unattended sub-region;

assembling, with a computing platform, the first and second portions of the additional frames into reconstructed image data frames; and updating the output on the display screen with the reconstructed image data frames.

2. The method of claim 1, wherein the display screen output is modified by changing the resolution of the unattended sub-region to be lower than the attended sub-region resolution or modified by changing the resolution of the attended sub-region to be greater than the unattended sub-region resolution.

3. The method of claim 1, wherein mapping the gaze pattern further comprises:
dividing the display screen into an m-by-n grid of sub-regions,
assigning a gaze pattern metric to one or more of the sub-regions; and
wherein determining the attended sub-region further comprises a comparison of the gaze pattern metric between the sub-regions.

4. The method of claim 1, wherein transmitting the additional frames of the image data to the computing platform further comprises applying a lower intraframe or interframe compression for the first portion of the collected image data frame than for the second portion of a collected image data frame; or subsampling the second portion of the collected image data frame.

5. The method of claim 1, wherein the frames of image data are collected with at least an HD resolution of 1,920×1,080 pixels, and wherein the reconstructed image data frame corresponding to the attended sub-region is displayed at the HD resolution while the unattended sub-region is displayed at a resolution below the HD resolution.

6. The method of claim 1, wherein the collected image data frames include the user, wherein the gaze pattern of the user is tracked based on the collected image data frames.

7. The method of claim 1, wherein the portion of the recorded frame of image data corresponding to the attended sub-region is determined by executing a contour detection algorithm on a collected image frame.

8. The method of claim 1, wherein updating the output on the display screen further comprises displaying with the reconstructed image data frames a graphical object rendered by the computing platform.

9. The method of claim 1, wherein the video image sensor has a field of view (FOV) encompassing a plurality of users, wherein the gaze pattern is tracked for each of the plurality of users, wherein a sub-region of the display screen being attended to by each of the plurality of users is determined, and wherein the display screen output is modified for each attended sub-region.

10. The method of claim 9, further comprising associating a user of the plurality with an input device based on the collected image frames, and
wherein the gaze pattern tracking is performed for only the user associated with the input device.

11. A non-transitory computer-readable medium having stored thereon a set of instructions, which when executed by a processing system, cause the processing system to perform a method comprising:

collecting image data with a video image sensor at a frame rate;
presenting output on a display screen, the output including one or more frames of the image data;
tracking a gaze pattern of a user viewing the display screen output;
mapping the gaze pattern to physical locations of the display screen;
determining, based on the mapping, a sub-region of the display screen being attended to by the user, the determining performed while collecting additional frames of image data with the video sensor, and performed periodically at a frequency below the frame rate, or in response to an indication the user blinked, or a gaze shift is above a threshold;
transmitting the additional frames of the image data to the computing platform with a greater bit rate for a first portion of each additional frame of the image data corresponding to the attended sub-region than for a second portion of each additional frame of the image data corresponding to the unattended sub-region;
assembling, with a computing platform, the first and second portions of the additional frames into reconstructed image data frames; and
updating the output on the display screen with the reconstructed image data frames.

12. An adaptive display system, comprising:
a video image sensor to collect image data at a frame rate;
a computing platform with a display screen to output one or more frames of the image data;
a gaze tracker to track a gaze pattern of a user viewing output from the display screen;
a gaze direction analyzer to map the gaze pattern to physical locations of the display screen and to determine, based on that map, a sub-region of the display screen being attended to by the user, wherein the determining is to be performed while collecting additional frames of image data with the video sensor, and performed periodically at a frequency below the frame rate, or in response to an indication the user blinked, or a gaze shift is above a threshold; and
an adaptive display processor to change the quantity of data representing an object displayed within the attended sub-region relative to an object displayed in an unattended sub-region of the display screen, wherein the adaptive display processor is further to cause the additional frames of image data to be transmitted to the computing platform with a greater bit rate for a first portion of each additional frame of the image data corresponding to the attended sub-region than for a second portion of each additional frame of the image data corresponding to the unattended sub-region, and
wherein the computing platform is to assemble the first and second portions of the additional frames into reconstructed image data frames, and is to update the output on the display screen with the reconstructed image data frames.

13. The system of claim 12, wherein the adaptive display processor is to modify the display screen output by changing the resolution of the unattended sub-region to be lower than the attended sub-region resolution or by changing the resolution of the attended sub-region to be greater than the unattended sub-region resolution.

14. The system of claim 12, wherein the gaze direction analyzer is to map the gaze pattern by dividing the display screen into an m-by-n grid of sub-regions, and assigning a gaze pattern metric to one or more of the sub-regions; and wherein the gaze direction analyzer is to determine the attended sub-region based on a comparison of the gaze pattern metric between the sub-regions.

15. The system of claim 14, wherein the gaze pattern metric is any of: a number of fixations, a gaze pattern scan length, or a gaze pattern scan area.

16. The system of claim 12, further comprising a compression engine to apply a lower intraframe or interframe compression for the first portion of the collected image data frame than for the second portion of a collected image data frame; or wherein the adaptive display processor is to subsample the second portion of the collected image data frame.

17. The system of claim 12, wherein the video image sensor is to collect the frames of image data with at least an HD resolution of 1,920×1,080 pixels, and wherein the display screen is to display the reconstructed image data frame corresponding to the attended sub-region at the HD resolution and the unattended sub-region at a resolution below the HD resolution.

18. The system of claim 12, wherein the collected image data frames include the user, and wherein the gaze tracker is to track the gaze pattern of the user based on the collected image data frames.

19. The system of claim 12, wherein the gaze direction analyzer is to determine the portion of the recorded frame of image data corresponding to the attended sub-region by executing a contour detection algorithm on a collected image frame.

20. The system of claim 12, wherein the computing platform is further to render a graphical object for display with the reconstructed image data frames.

21. The system of claim 12, wherein the gaze tracker is to track a gaze pattern for each of a plurality of users, wherein the gaze direction analyzer is to determine a sub-region of the display screen being attended to by each of the plurality of users.

22. The system of claim 21, further comprising a user input device identifiable by the computing platform, and wherein the gaze tracker is to track a gaze pattern of only a user associated, based on the collected image frames, with the input device.

* * * * *